United States Patent
Sahu et al.

(10) Patent No.: US 12,450,299 B2
(45) Date of Patent: Oct. 21, 2025

(54) SYSTEM AND METHOD TO CREATE A SENTIMENT-BASED INDEX FOR SEARCHABLE COMMUNICATIONS

(71) Applicant: Mitel Networks Corporation, Kanata (CA)

(72) Inventors: Birendra Kumar Sahu, Karnataka (IN); Logendra Naidoo, Ottawa (CA)

(73) Assignee: MITEL NETWORKS CORPORATION, Kanata (CA)

( * ) Notice: Subject to any disclaimer, the term of this patent is extended or adjusted under 35 U.S.C. 154(b) by 0 days.

(21) Appl. No.: 18/231,171

(22) Filed: Aug. 7, 2023

(65) Prior Publication Data

US 2025/0053599 A1    Feb. 13, 2025

(51) Int. Cl.
| | | |
|---|---|---|
| G06F 16/00 | (2019.01) | |
| G06F 16/951 | (2019.01) | |
| G06F 16/953 | (2019.01) | |
| G10L 15/18 | (2013.01) | |
| G10L 15/30 | (2013.01) | |
| G10L 25/63 | (2013.01) | |
| G06Q 10/10 | (2023.01) | |
| G10L 15/08 | (2006.01) | |

(52) U.S. Cl.
CPC .......... *G06F 16/951* (2019.01); *G06F 16/953* (2019.01); *G10L 15/1815* (2013.01); *G10L 15/30* (2013.01); *G10L 25/63* (2013.01); *G06Q 10/10* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 2009/0125320 A1* | 5/2009 | Bickett | G06Q 30/02 705/1.1 |
| 2009/0248399 A1* | 10/2009 | Au | G06F 40/237 704/9 |
| 2016/0179933 A1 | 6/2016 | Dimassimo et al. | |
| 2019/0005315 A1* | 1/2019 | Barros | H04N 23/60 |
| 2021/0158805 A1 | 5/2021 | Sivasubramanian | |
| 2021/0335367 A1 | 10/2021 | Graff et al. | |

FOREIGN PATENT DOCUMENTS

| | | | | |
|---|---|---|---|---|
| WO | WO-2015047075 A1 * | 4/2015 | ......... | G06F 16/9535 |
| WO | WO-2022183138 A2 * | 9/2022 | ............ | G06F 40/30 |

OTHER PUBLICATIONS

Ken et al., Method for Analyzing Customer Satisfaction, May 19, 2020, 10 pages. (Year: 2020).*
Kang, "Sentiment-Based Query Processing System and Method", May 1, 2014, 16 pages (Year: 2014).*
EPO; Extended European Search Report dated Feb. 17, 2025 in Application Serial No. 24193149.2.

* cited by examiner

*Primary Examiner* — Bai D Vu

(57) ABSTRACT

A computer system and method searches organizational communications utilizing sentiment analysis of communication artifacts. A data-collection server first collects organizational data that includes communication artifacts. One or more searchable databases is in communication with the data-collection server and stores the communication artifacts. A search engine searches the databases for the communication artifacts in order to create a sentiment index for one or more sentiment types, wherein each sentiment type is stored in a separate database. A sentiment engine searches and analyzes each of the sentiment databases to create a sentiment index.

20 Claims, 3 Drawing Sheets

SYSTEM AND METHOD TO CREATE A SENTIMENT-BASED INDEX FOR SEARCHABLE COMMUNICATIONS

BACKGROUND

The application of sentiment-based analysis to develop a searchable index of personnel can help organizations gain insights into the attitudes, emotions, and opinions of personnel, particularly personnel who are conference participants. By analyzing the sentiment expressed in communication artifacts, such as artifacts from online conferences (dialog and chat) and electronic communications (emails, instant messaging, and others), organizations can identify areas of agreement, disagreement, positivity, negativity, hope, joy, despair, excitement, contentment, anxiety, anger, and other sentiments. Knowing those metrics can improve organizational decision-making processes, plus they can be used to enhance the communications and collaborations within organizational teams.

A searchable index of personnel sentiments, including those from conference outputs, can also save time and improve efficiency by making it easier to locate relevant sentiment information quickly. Additionally, sentiment analysis can be applied to customer service interactions and help organizations improve customer service and enhance customer satisfaction.

Furthermore, aggression in the workplace may cost employers tens of billions of dollars. https://www.forbes.com/sites/edwardsegal/2021/12/16/workplace-misconduct-cost-us-businesses-20-billion-in-past-year-new-study/?sh=2f809626275f and https://www.tlnt.com/articles/workplace-violence-affects-millions-costs-billions "Workplace aggression (i.e. abuse, threats, or the assault of staff in circumstances related to their work) is a significant problem for organizations worldwide Spector et al., 2007; Stutzenberger and Fisher, 2014. Globally, the cost of workplace aggression to organizations is enormous, affecting core business and resulting in losses of millions of dollars each year." See https://journals.sagepub.com/doi/full/10.1177/0312896218768378.

Sentiment analysis has been an area of active research and there have been several available solutions. Some examples of previous solutions are (1) Rule-based approaches. These approaches involve using sets of predefined rules to identify positive, negative, or neutral sentiment in text. Rule-based approaches could be effective for simple sentiment analysis tasks, but are limited in their ability to manage complex language and nuances of sentiment. (2) Lexicon-based approaches. These approaches involve the use of sentiment dictionaries or lexicons to assign a sentiment score to certain word communications. The overall sentiment of the communication is then calculated by aggregating the scores of each of the words. While lexicon-based approaches are more accurate than rule-based approaches, they still have limitations in their ability to manage complex language and context. (3) Machine learning-based approaches. These approaches involve training machine learning models on large datasets of annotated text to identify patterns of sentiment. Machine learning-based approaches have become increasingly popular, as they can manage complex language and context and are more accurate than rule-based and lexicon-based approaches. (4) Hybrid approaches. These combine rule-based, lexicon-based, and machine learning-based approaches to overcome limitations of the individual approaches. For example, a hybrid approach might use machine learning algorithms to identify sentiment in a communication, and then use rule-based approaches to further refine the analysis.

SUMMARY

The systems and methods of this disclosure provide a comprehensive and scalable approach to sentiment analysis that can manage large volumes of communication data. Unlike previous solutions, the disclosed systems and methods involve analyzing several types of communication data, including audio, electronic, and video communications, which can provide deeper insights into the sentiment and emotions expressed by individuals within an organization. Additionally, the optional use of natural language processing (NLP) for text communications and the Ryerson Audio-Visual Database of Emotional Speech and Song (RAVDESS) in audio communications can help to improve the accuracy of sentiment analysis.

There are also alternative approaches to determine sentiment (individual or collective insight into sentiment) potentially without one or more of NLP and RAVDESS:

(1) Some organizations may assign a predefined set of sentiment labels to customer or sales-related dialog in the logs. For example, positive, negative, neutral or others. Agents or supervisors can assign these labels to their communications manually, a processor may analyze the dialing and assign sentiment labels automatically based on language and/or tone, indicating an overall sentiment. Sentiment may also be embedded in performance reviews.

(2) Emoji-based indicators usually occur in instant messaging. For example, "How was your conversation with Jack?" "😊." These indicators may be used in determining sentiment and the frequency with which certain indicators are used and the timing of their use, e.g., older uses may not be weighed as heavily as recent uses, may be considered in determining sentiment.

(3) Emoticons or emojis can sometimes indicate sentiment. A set of predefined emojis may be associated with positive, negative, neutral, or other sentiments. The recency (i.e., old versus recent) of these measurable indicators and their frequency in communications can assist in determining a sentiment.

(4) Visual content such as images or video feeds can be analyzed for sentiment. This may include analyzing visual cues such as facial-expression recognition, body language, or colors, to infer sentiment. Such an analysis requires an analysis capability, which can be provided by a computer having appropriate software and processing capabilities and a camera to capture the images or video. Virtual backgrounds (beach, mountain, forest, tropical setting, etc.), for example, could also, or in addition, indicate the disposition of an individual.

(5) Customer relationship management (CRM) metrics such as customer engagement rates (which measure the level of engagement generated from created organizational content such as a brand campaign), customer response times, customer call traffic, or social media shares. Each of these indirectly indicate sentiment. Greater engagement metrics, quick response times, etc., can indicate positive sentiment, whereas low engagement or slow response times, etc., suggests negative sentiment.

(6) Survey feedback from polling employees about their mood regarding specific communications can be helpful for learning sentiment. For example, asking "How did your Zoom call go?" Also, qualitative data can supplement sentiment analysis through NLP or other approaches to determine sentiment.

For each of the sentiments determined using one or more of NLP, RAVDESS, and any or all of the alternate approaches, the frequency of a measured sentiment indicator and its age (wherein newer sentiments may be given more weight than older sentiments) can be used to help determine an overall sentiment.

The systems and methods described herein involve the generation of output from audio, electronic, and/or video communication systems, and the initialization of a database of searchable communication artifacts. The communication artifacts include emails, meetings, recordings, social media posts, and other communication types. The communication artifacts are analyzed to create sentiment artifacts, which preferably organized and tagged with a searchable layer comprising metadata that is not already in the sentiment artifacts, such as ID data, name, time, type of communication, and others.

The communications are analyzed for sentiment, and the sentiment analysis is maintained for each identified user (or participant, or individual). For text communications, NLP analysis may be used to determine positive, negative, neutral, or other sentiment. For audio or video communications, the RAVDESS may be applied to determine sentiment. Or, one or more of the alternate approaches mentioned above may be used, with or without one or more of NLP and RAVDESS, to determine sentiment.

Based on an analysis of the communications, a sentiment index is created and updated with the sentiment analysis results. The searchability layer is preferably applied to enable quick and efficient searching of the sentiment artifacts database for specific artifacts.

Systems and methods of this disclosure thus include the creation of a searchable database that can be used to efficiently search for specific sentiment artifacts. This aspect is particularly useful for large organizations or those dealing with large volumes of communication data. Additionally, sentiment indexes may be continually updated with new data, which helps to keep the indexes current and accurate.

BRIEF DESCRIPTION OF THE DRAWINGS

The subject matter of the present disclosure is particularly pointed out and distinctly claimed in the concluding portion of this specification. A more complete understanding of the present disclosure, however, may best be obtained by referring to the detailed description and claims when considered in connection with the drawing figures, wherein like numerals denote like elements and wherein:

Figure 1:
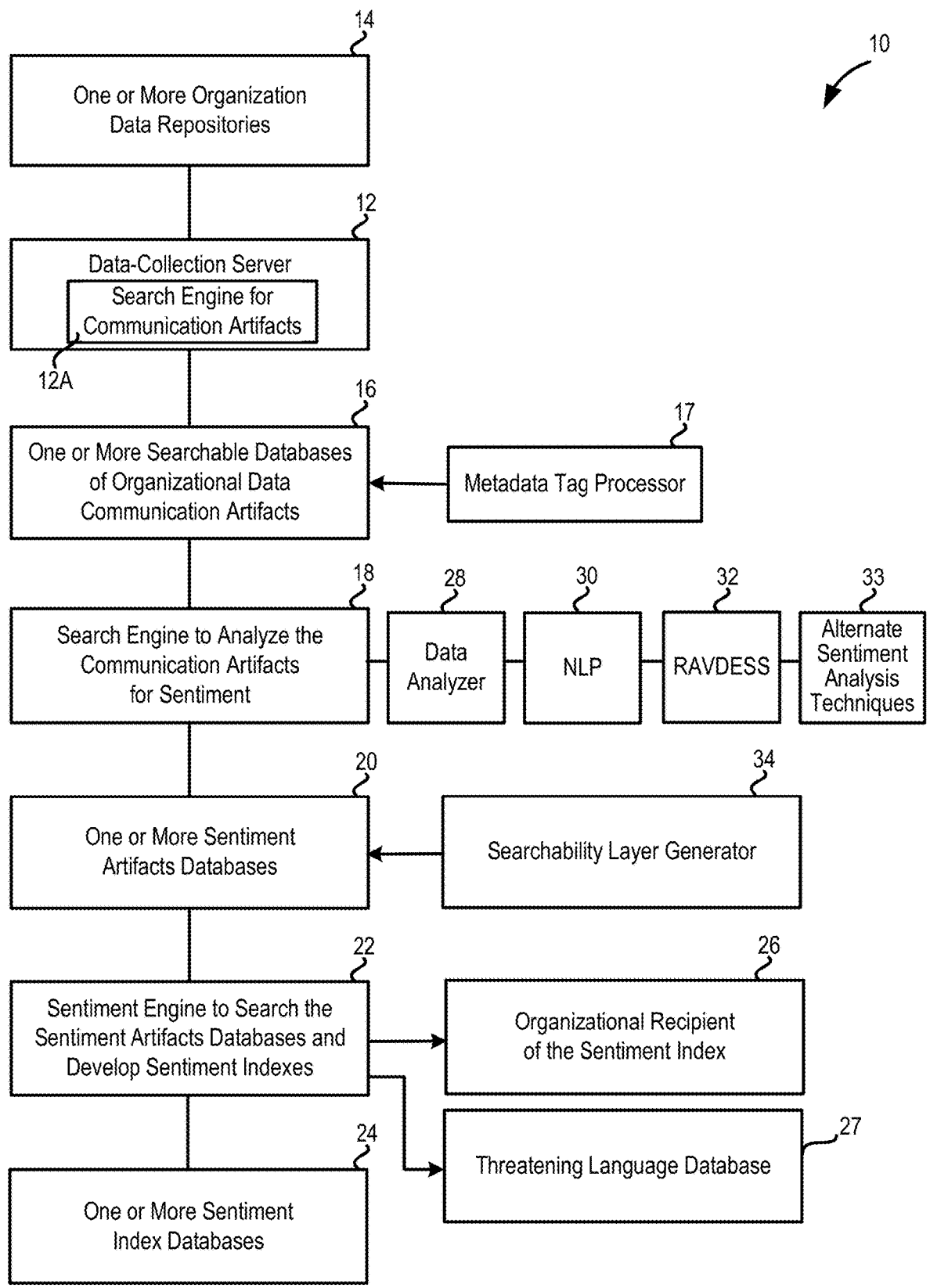
FIG. 1 is an exemplary system according to aspects of this disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION

As used herein, the terms application, module, analyzer, engine, and the like can refer to computer program instructions, encoded on computer storage medium for execution by, or to control the operation of, data processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium is non-transitory and can also be, or be included in, one or more separate physical components or media (e.g., solid-state memory that forms part of a device, disks, or other storage devices).

As used herein, "engine" refers to a data-processing apparatus, such as a processor, configured to execute computer program instructions, encoded on computer storage medium, wherein the instructions control the operation of the engine. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of the substrates and devices. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., solid-state memory that forms part of a device, disks, or other storage devices). In accordance with examples of the disclosure, a non-transient computer readable medium containing program can perform functions of one or more methods, modules, engines and/or other system components as described herein.

Turning now to the figures, wherein the purpose is to describe embodiments of this disclosure and not to limit the scope of the claims, FIG. 1 illustrates a system 10 according to aspects of this disclosure. System 10 includes a data collection server 12 that collects communications from one or more organization data repositories 14, which include any number of data storages, such as one or more of email servers, conference databases, online search databases by organization participants, chat databases, databases of social media posts, video recording databases, audio recording databases, social media platforms, recording devices, and others, and includes one or more of audio, electronic text, images, and video communications stored in each of the one or more organization data repositories 14. The organizational data in the one or more organization data repositories 14 can be obtained from various organizational communication channels.

Once the data is collected by data collection server 12, it is processed by search engine 12A to extract communication artifacts. Data collection server 12 stores the communication artifacts from the one or more organization data repositories 14 into one or more databases of communication artifacts 16, wherein each type of different communication artifact may be stored in a separate database 16. The one or more databases 16 can each or respectively contain various types of communication artifacts such as emails, chats, meeting notes, videoconferences, calendar notes, information from written documents, recordings, and social media posts. The communication artifacts can be in the form of text, audio, or video. Each database 16 of the communication artifacts identified by search engine 12A is tagged with metadata not in the communication artifacts, such as ID data, name, date, time, type of communication, and so on, by metadata tag processor 17, which is in communication with or is part of the one or more communication artifacts databases 16. The metadata tagged to the communication artifacts is useful for organizing and searching the one or more databases 16 efficiently.

A search engine 18 is configured to search each of the one or more databases 16 to analyze the communication artifacts for sentiment by individual within the organization and store the sentiment artifacts in one or more sentiment artifacts databases 20. The sentiment artifacts can include all or portions of the communication artifacts, such as all or portions of email bodies, chat transcripts, social media posts, audio transcripts, audio recordings, and visual recordings. If the sentiment artifacts are in the form of audio recordings, the audio may be transcribed into text. This is useful for searching by sentiment engine 22 the one or more sentiment artifacts databases 20 for specific keywords or phrases to identify sentiment. Or, raw audio recordings may be stored in the one or more sentiment artifacts databases 20. Different sentiments may be saved in different ones of sentiment artifacts databases 20

Data analyzer 28 is in communication with, or includes, natural language processor (NLP) 30, a RAVDESS module 32, and a processor 33 that includes software configured to access and utilize one or more alternate sentiment analysis techniques, such as those previously mentioned in this disclosure, i.e., (1) a predefined set of sentiment labels assigned by the organization, (2) emoji-based indicators, (3) emoticons or emojis, (4) visual content, (5) CRM metrics, and (6) survey feedback, wherein each type of alternate sentiment analysis can be used by search engine 18 to analyze the communication artifacts for sentiment. The NLP 30 may be used to analyze for text communications, audio and visual communication sentiments may be analyzed by applying the RAVDESS module 32, and the processor 33 can be used to analyse sentiment utilizing any one or more of the alternate techniques discussed herein.

A searchability layer, which is metadate tags, is preferably applied to the one or more sentiment artifact databases 20 by searchability layer generator 34 in order to enable efficient searching of the sentiment artifacts by sentiment engine 22. The metadata tags include information preferably not already included in the sentiment artifacts, such as identification (ID) data, name(s) of person who sent, received, are copied on, or are mentioned in the communication artifacts, time and data associated with the communication artifact, and/or type of communication, such as email, chat, conference, audio or visual call, or social media post, from which the communication artifact originated.

A sentiment engine 22 is configured to search each of the one or more sentiment artifacts databases 20 to determine a sentiment index, which can be numerical score or ranking that indicates the relative strength of a particular sentiment, for an individual, a group, or an organization. The analysis can identify and assign an index for essentially any sentiment, such as one or more of positive, negative, neutral, anger, resentment, contentment, joy, anxiety, peacefulness, displeasure, fear, hope, despair, excitement, and others.

An optional threatening language database 27 may be in communication with sentiment engine 22. Threatening language database 27 includes words, phrases, and images (such as emojis) that would suggest improper organizational behavior, such as threats, abuse, hatred, racial, religious, or other illegal or improper bias, aggression towards another person, pornography, improper sexual innuendos, or other improper behavior. Based on an analysis of the sentiment artifacts versus the information in the threatening language database, the sentiment engine 22 may cause the corresponding communication from the one or more organization data repositories 14 to be sent to an organization recipient 26, or the sentiment engine 22 may assign a sentiment index to the sentiment artifact associated with the threatening language and forward it to the organizational recipient 26. Organization recipient 26 could then investigate further and obtain the original communication that included the sentiment artifact with the threatening language.

The sentiment index(es) are added to the one or more sentiment index databases 24, wherein each database could be specific to a specific sentiment and a sentiment index is preferably maintained for each individual within the organization. A sentiment index database 24 can be searched for a particular sentiment index of an individual, a group, or an organization. Storing the sentiment index(es) is useful for analyzing the sentiment expressed by an individual over time. The sentiment index may be continually updated with new data as it becomes available. This ensures that the sentiment index(es) remain up-to-date and relevant.

A sentiment index for an individual, group, or the organization may be transmitted to an organizational recipient 26, such as a supervisor, the human resources (HR) department, executive management, or others based on an inquiry to sentiment engine 22, which can provide the sentiment index (1) immediately based on the sentiment index known to it or it can access the one or more sentiment databases 24 to provide a stored sentiment index, (2) based on a programmed periodic provision of one or more sentiment indexes, or (3) based on an alert sensed by sentiment engine 22. Such an alert could be a detection of workplace harassment, violence, threats, abuse, assault, drug use, or a sentiment index below an acceptable threshold for an individual, group, or the organization, wherein the low sentiment index indicates that action should be taken to address a problem.

Figure 2:
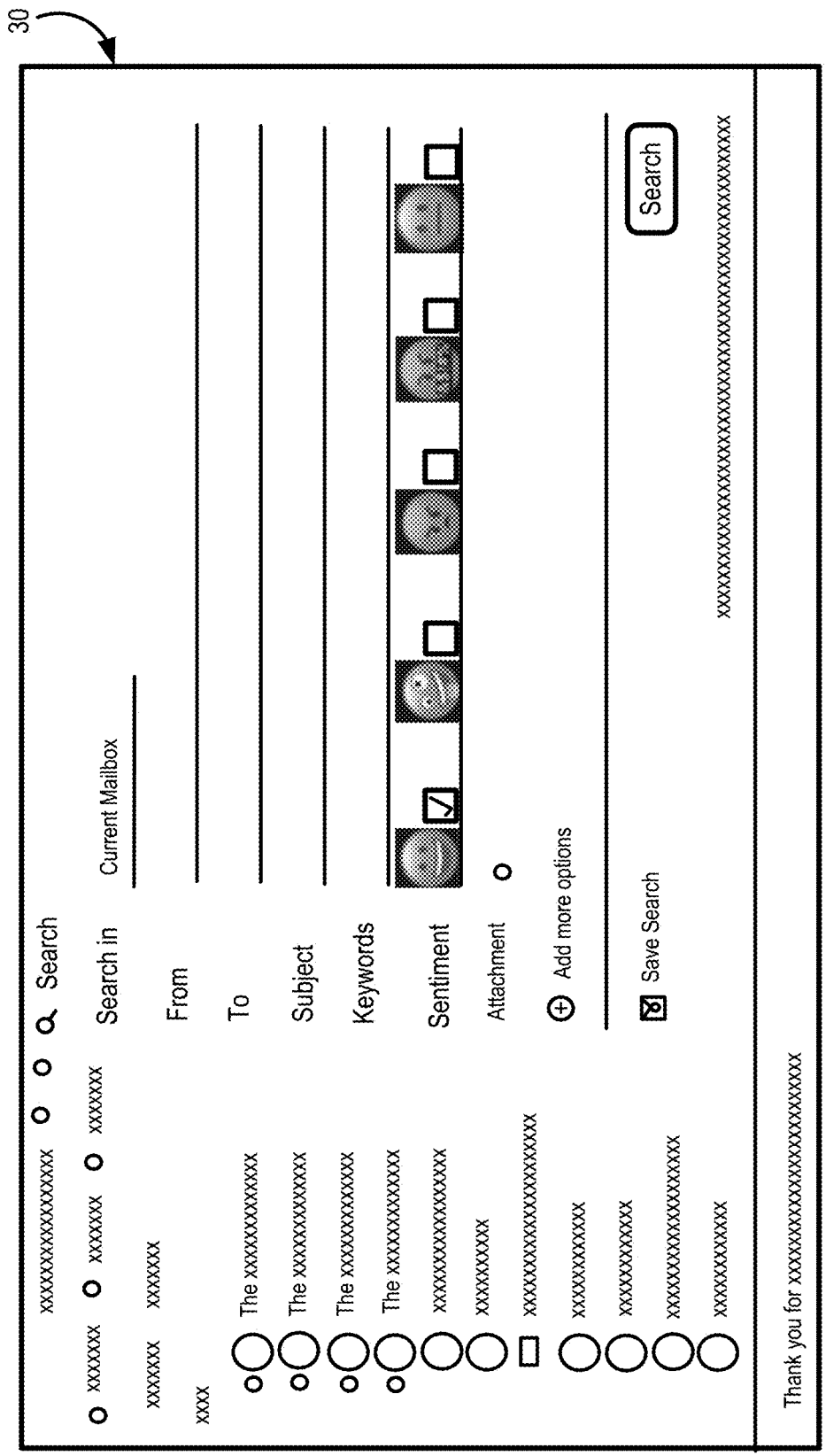
FIG. 2 is an example of sentiments for a participant according to aspects of this disclosure.

FIG. 2 illustrates a sample of a sentiment search index integrated in Microsoft® Outlook.

Figure 3:
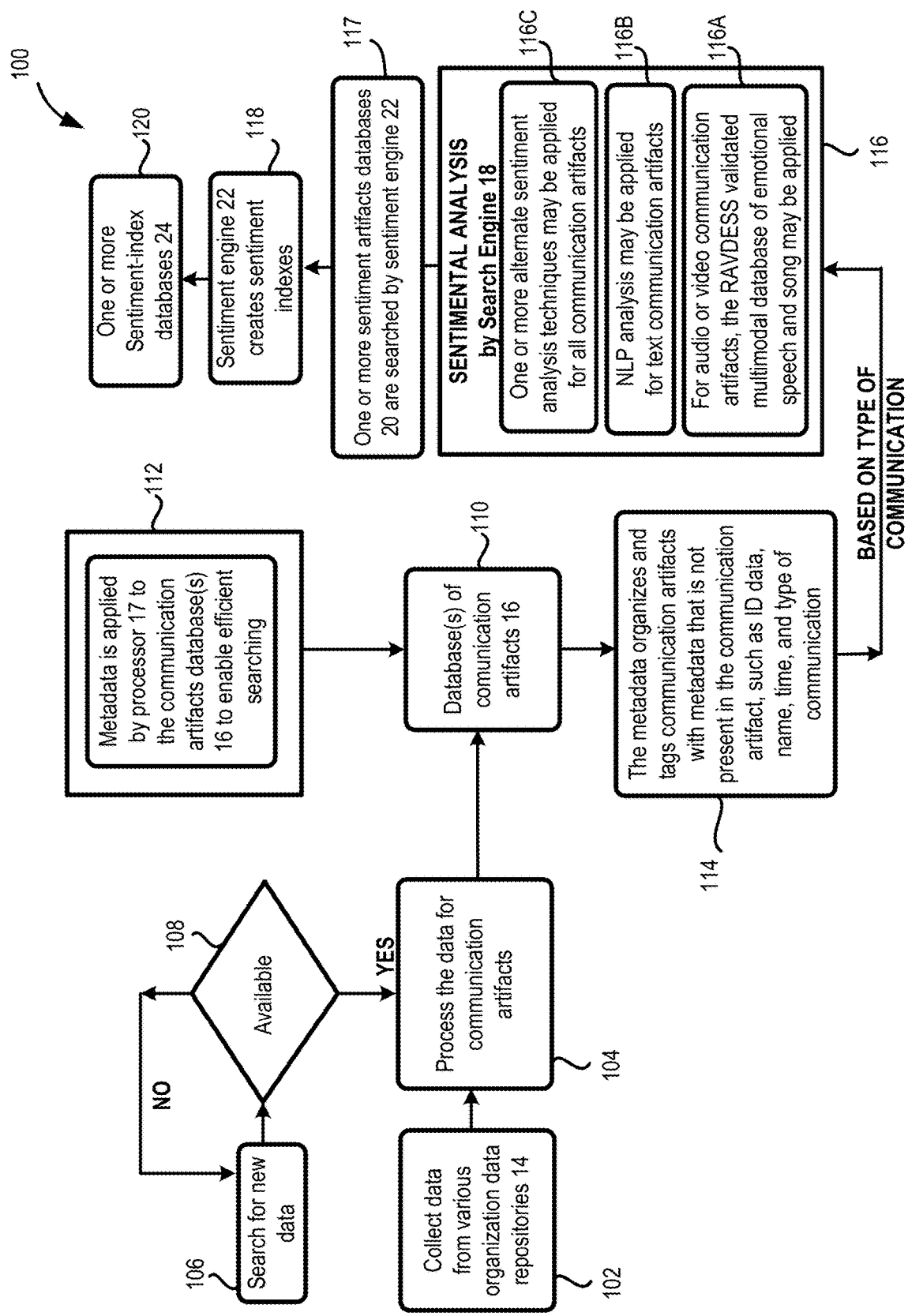
FIG. 3 illustrates an exemplary method according to aspects of this disclosure.

FIG. 3 illustrates a method 100 according to this disclosure. At step 102 data is collected by data-collection server 12 from various communication sources within an organization and stored in organization data repositories 14. At step 104 the data is processed, such as by data collection server 12. Steps 106 and 108 represent an update loop, wherein the system and method of this disclosure continuously or periodically search for new data to be processed at step 104.

The processed data is then stored in one or more communication artifacts storage databases 16 at step 110. A searchability layer (or metadata) is applied to the one or more communication artifacts databases (step 110) by metadata tag processor 17 (step 112). This enables efficient searching of the communication artifacts. At step 114 communication artifacts are tagged by processor 17 with the metadata, such as ID data, name, time, and the type of communication.

At step 116, for audio communications (step 116A) the RAVDESS validated, multi-model database of emotional speech and song may be applied by search engine 18 to analyze the sentiment of the communication artifacts. For textual communications, NLP analysis (step 116B) may be applied to analyze the sentiment by search engine 18. At step 116C, one or more alternate analysis techniques, such as the ones discussed above, may be applied to analyse sentiment. So, one or more of RAVDESS, NLP, and any of the alternate analysis techniques can be used to analyze sentiment. The analyzed sentiment is utilized to create one or more sentiment artifacts databases 20, which preferably have a searchability layer applied by generator 34 (step 117). Sentiment engine 22 then analyzes the one or more sentiment artifacts databases 20 to create one or more sentiment indexes at step 118. These are stored in one or more sentiment index databases at step 120.

Overall, the process of analysing and organizing communication data for sentiment analysis is useful for various fields such as customer service, market research, and social media analysis. By understanding the sentiment expressed in the communication data, organizations can gain valuable insights into customer behaviour and preferences, identify potential issues or opportunities, and improve their overall operations.

Example Use Case

A human resources professional wants to find emails for an employee Jane that has apparently a track record for generally upbeat and happy interactions with customers during online meetings. The same employee Jane apparently treats staff much differently whenever she sends emails or during team meetings online. A recent development has arisen whenever she leaves voicemails to her subordinates. HR investigates by running a search using the available corporate communication database.

HR uses the sentiment engine 22 to search one or more sentiment index databases 24 according to communications "From: Jane Thompson+CustomerX+Happy [sentiment]" returns search result 38 hits: 12 emails; 20 meetings in 2022; 5 meetings in 2021; 1 chat session.

HR also runs a similar search for staff members interacting with Jane: "From: Jane Thompson+{Staff Member 1; Staff member 2 . . . }+Terse/Angry [sentiment]" returns search result 428 hits: 312 emails; 50 meetings in 2022; 5 meetings in 2021; 33 chat sessions.

Possible Variations

There are several possible variations to the system and method described herein, depending on the specific needs and goals of the application. Some examples follow:

(1) Integration with machine learning, wherein in addition to sentiment analysis, machine learning algorithms could be incorporated to identify patterns or trends in the communication data that are not immediately apparent to human analysts. This could enable the system 10 to make more accurate predictions or recommendations based on the organizational data.

(2) Customization of sentiment analysis. While the RAVDESS application is a useful tool for analyzing emotional speech and song, it may not capture the full range of emotions expressed in all types of communications. Custom sentiment analysis models could be developed for specific domains or applications, such as healthcare or finance, to better capture the nuances of the language used in those contexts.

(3) Real-time analysis. Instead of analyzing communication data after the fact, the system could be designed to analyze data in real-time, as it is generated, wherein the organizational data is provided directly to data collection server 12. This could enable faster responses to emerging issues or trends and enable more proactive engagement with customers or users.

Other Applications

Apart from customer service, market research, and social media analysis, the system and method described can be applied to various other fields such as:

(1) Internet commerce. Sentiment analysis can be applied to customer-based searches for services by applying a sentiment rating to certain businesses. The analyzed communication sentiments can produce a less objective score for rating a business. Customers are more likely to direct their business towards a company that is stronger at handling customer relationship management (CRM) than companies that are not customer-service oriented.

(2) Human resources. Sentiment analysis can be used to analyze employee feedback and reviews, performance appraisals, and exit interviews to gain insights into employee sentiment, identify areas of improvement, and enhance employee engagement.

(3) Healthcare. Sentiment analysis can be used to analyze patient feedback, reviews, and analyze social media posts to understand patient satisfaction, identify areas of improvement, and enhance patient experience.

(4) Politics. Sentiment analysis can be used to analyze social media posts, speeches, and debates to understand public opinion and sentiment towards political parties, candidates, and policies.

(5) Education. Sentiment analysis can be used to analyze student feedback, surveys, and social media posts to understand student sentiment, identify areas of improvement, and enhance student experience.

(6) Finance. Sentiment analysis can be used to analyze financial news, reports, and social media posts to understand investor sentiment and predict market trends.

The systems and methods of this disclosure can be applied in any field that involves large volumes of communication data to gain insights into the sentiment and emotions expressed within the data and enhance decision-making processes.

The description of embodiments provided herein is merely exemplary and is intended for purposes of illustration only; the following description is not intended to limit the scope of the claims. Moreover, recitation of multiple embodiments having stated features is not intended to exclude other embodiments having additional or fewer features or other embodiments incorporating different combinations of the stated features. The methods and systems according to this disclosure and claims can operate in a premise, cloud-based, or hybrid environment.

The features of the various embodiments may be stand alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A computer system for searching organizational communications utilizing sentiment analysis of communication artifacts, the system comprising:
   a data-collection server configured to collect organizational data that includes communication artifacts;
   one or more searchable databases in communication with the data-collection server and configured to store the organizational data;
   a search engine in communication with the one or more searchable databases and configured to search the one or more searchable databases for the communication artifacts in order to extract communication artifacts and create a sentiment index comprising a numerical score or ranking indicating a strength of a sentiment for an individual, a group, or an organization, the search engine comprising a processor configured to execute instructions that control the operation of the search engine, wherein the search engine is configured to (a) analyze the communication artifacts for sentiment, and (b) store the sentiment index in a separate sentiment index database of a plurality of sentiment index databases each searchable for the sentiment index of at least one of the individual, the group, and the organization; and
   a sentiment engine configured to search and analyze each of the separate sentiment index databases to determine, using at least on the numerical score or ranking of the sentiment index, the sentiment index for one or more of (i) the organization, (ii) a group within the organization, (iii) a group outside of the organization, or (iv) the individual, the sentiment engine comprising a processor configured to execute instructions that control the operation of the sentiment engine.

2. The computer system of claim 1, wherein the sentiment index comprises one or more of anger, frustration, apathy, anxiety, contentment, sadness, happiness, appreciation, enthusiasm, professionalism, responsiveness, courteousness, aggression, and satisfaction.

3. The computer system of claim 2, wherein the sentiment engine, depending on the sentiment index, does one of the following: (a) nothing, (b) forwards the sentiment index to a supervisor of an individual in the organization, (c) forwards the sentiment index to a human resources department, or (d) forwards the sentiment index to an organization officer.

4. The computer system of claim 1 that is further configured to analyze each sentiment index as related to an organizational function, wherein the organizational function is one of information technology (IT), customer service, accounting, product repair services, product quality, returns, and human resources.

5. The computer system of claim 1, wherein the sentiment engine is further configured to combine a plurality of the sentiment indexes as into an amalgamated sentiment index.

6. The computer system of claim 1, wherein the communication artifacts are one or more of emails, chats, meeting content, recordings, internet searches and the topics or websites searched, employer feedback, employer reviews, performance appraisals, exit interviews, and social media posts, and are in the form of text, audio, or video.

7. The computer system of claim 1, wherein the one or more searchable databases are configured so that each communication artifact is tagged with metadata, wherein the metadata is not already included in the communication artifact and is one or more of identification (ID) data, name, time, and type of communication.

8. The computer system of claim 1, wherein the sentiment engine is further configured to assign a risk factor to one or more communication artifacts based on one or more of (a) threatening language identified, and (b) comparing the threatening language identified to a threatening language database.

9. The computer system of claim 8, wherein when the communication is identified as threatening, and based on the risk factor assigned, the sentiment engine is further configured to perform one or more of the following functions: contact one or more of (i) a human resources department of the organization, (ii) a supervisor of the individual of the threatening language, and (iii) an officer of the organization.

10. The computer system of claim 1, wherein when any of the communication artifacts is in the form of an audio recording, the audio recording is transcribed into text by the data-collection server, and the text is stored in one of the one or more searchable databases in order to be searched by the search engine for keywords or phrases.

11. The system of claim 1, wherein the communication artifacts are analysed by a data analyser in communication with the search engine for sentiment by using one or more of (a) natural language processing (NLP) techniques for text communications, (b) the Ryerson Audio-Visual Database of Emotional Speech and Song (RAVDESS) validated multimodal database of emotional speech and song for audio or video communications, or (c) alternate sentiment analysis techniques.

12. A computerized method searching organizational communications utilizing sentiment analysis of communication artifacts, the method comprising the steps of:
   using a data-collection server, collecting organizational data that includes communication artifacts;
   storing the organizational data in one or more searchable databases in communication with the data-collection server;
   searching, utilizing a search engine in communication with the one or more searchable databases, the one or more searchable databases for the communication artifacts in order to extract communication artifacts and create a sentiment index comprising a numerical score or ranking indicating a strength of a sentiment for an individual, a group, or an organization, the search engine comprising a processor configured to execute instructions that control the operation of the search engine, wherein the search engine is configured to (a) analyze the communication artifacts for sentiment, and (b) store the sentiment index in a separate sentiment index database of a plurality of sentiment index databases each searchable for the sentiment index of at least one of the individual, the group, and the organization; and
   searching and analyzing, using a sentiment engine, each of the separate sentiment index databases to determine, using at least on the numerical score or ranking of the sentiment index, the sentiment index for one or more of (i) the organization, (ii) a group within the organization, (iii) a group outside of the organization, or (iv) the individual, the sentiment engine comprising a processor configured to execute instructions that control the operation of the sentiment engine.

13. The computerized method of claim 12 that further includes the step of the search engine searching the sentiment index for artifacts associated with a particular sentiment, the computerized method further comprising:

tagging each communication artifact in the one or more searchable databases with metadata, the metadata not already being included in the communication artifact and comprising one or more of identification (ID) data, name, time, and type of communication.

14. The computerized method of claim 12 that further includes the step of the data-collection server applying metadata to the one or more searchable databases, wherein the metadata is not already included in the communication artifact and is one or more of identification (ID) data, name, time, and type of communication.

15. The computerized method of claim 12, wherein one of the sentiments is aggression, wherein the aggression is one or more of abuse, sexually-explicit language, assault, and threats of assault.

16. The computerized method of claim 12 that further includes the step of the sentiment engine sending a communication to a person, manager, officer, or organization group based on the sentiment index.

17. A computer system for searching organizational communications utilizing sentiment analysis of communication artifacts, the system comprising:

a data-collection server configured to collect organizational data that includes communication artifacts;

one or more searchable databases in communication with the data-collection server and configured to store the organizational data; and a search engine in communication with the one or more searchable databases and configured to search the one or more searchable databases for the communication artifacts in order to extract communication artifacts and create a sentiment index comprising a numerical score or ranking indicating a strength of a sentiment for an individual, a group, or an organization, the search engine comprising a processor configured to execute instructions that control the operation of the search engine, wherein the search engine analyzes the communication artifacts for sentiment in order to create the sentiment index and stores the sentiment index in a separate sentiment index database of a plurality of sentiment index databases each searchable for the sentiment index of at least one of the individual, the group, and the organization;

a sentiment engine configured to search and analyze each of the separate sentiment index databases to determine, using at least on the numerical score or ranking of the sentiment index, the sentiment index for one or more of (i) the organization, (ii) a group within the organization, (iii) a group outside of the organization, or (iv) the individual, the sentiment engine comprising a processor configured to execute instructions that control the operation of the sentiment engine.

18. The computer system of claim 17, wherein the search engine determines the sentiment index for multiple communications and combines the multiple communications to create an overall sentiment index.

19. The computer system of claim 17, wherein the search engine further includes a machine-learning algorithm configured to identify patterns or trends in the sentiment index.

20. The computer system of claim 19, wherein the machine-learning algorithm is further configured to identify patterns or trends in the sentiment index for each organization individual.

* * * * *